Dec. 24, 1957    E. G. BODEN ET AL    2,817,142
HYDRAULIC ASSEMBLY FOR REMOVING INTERFERENCE-FITTED RINGS
Filed July 19, 1952
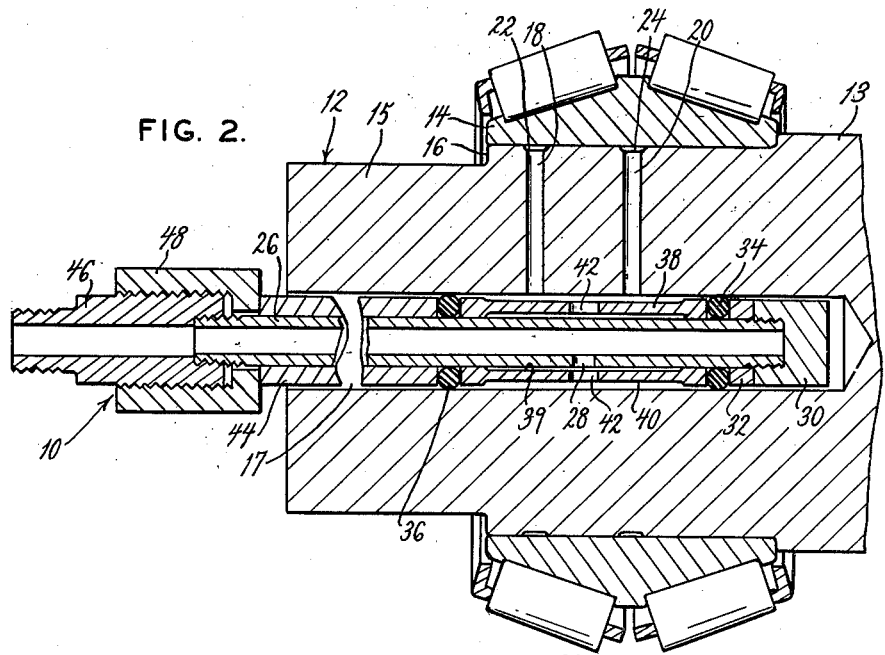
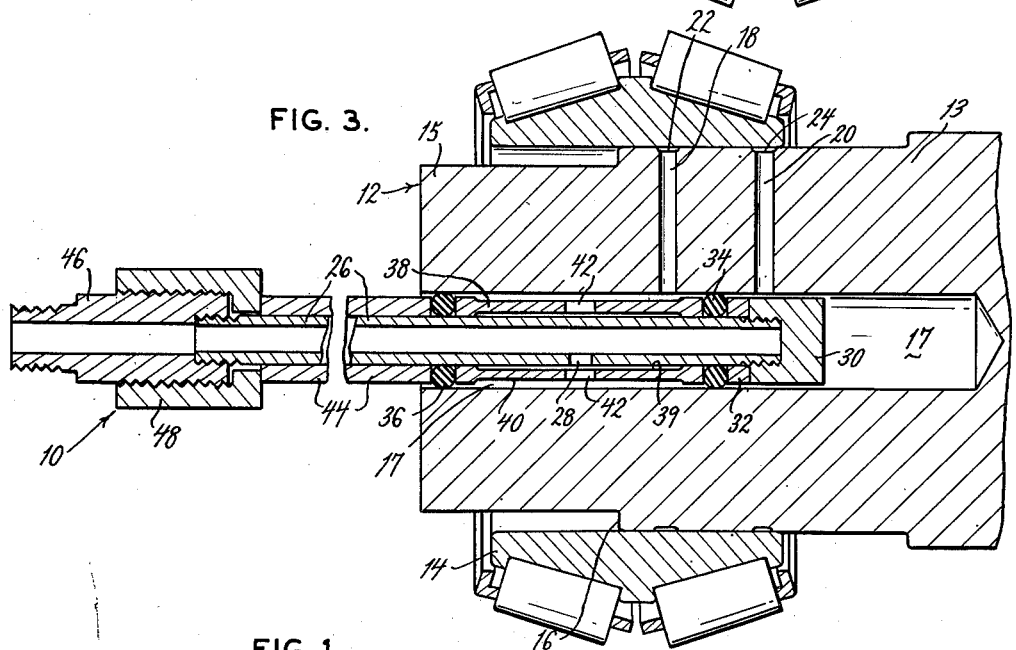
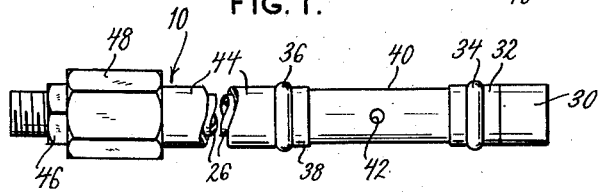
INVENTORS
ERNEST G. BODEN
RICHARD F. HOFER
BY Gravely, Lieder,
Woodruff & Dess
ATTORNEYS

United States Patent Office 2,817,142
Patented Dec. 24, 1957

2,817,142

HYDRAULIC ASSEMBLY FOR REMOVING INTERFERENCE-FITTED RINGS

Ernest G. Boden and Richard F. Hofer, Canton, Ohio, assignors to The Timken Roller Bearing Company, Canton, Ohio, a corporation of Ohio Application July 19, 1952, Serial No. 299,842

2 Claims. (Cl. 29—234)

The present invention relates generally to the interference-fitted ring art and more particularly to a novel hydraulic assembly for removing interference-fitted straight or tapered bore rings such as bearing race members, gears, collars, couplings and the like, from shafts, axles, mill roll necks and the like.

At the present time the removal of interference-fitted rings from shafts is facilitated by means which includes a series of axial bores in the shaft, each bore communicating with a separate radially extending passageway which intersects a separate peripheral oil-dispersing groove. Means are provided for admitting fluid under pressure to each of the axial bores whereby fluid pressure can be transmitted to the peripheral groove associated therewith.

This construction employing a plurality of axial bores is not completely satisfactory, and therefore it is an object of the present invention to provide a novel hydraulic assembly for removing interference-fitted rings from shafts whereby fluid pressure can be supplied to selected peripheral grooves using only a single axial bore in the shaft. More particularly it is an object to provide such an assembly whereby fluid under pressure can be limited to any selected portion of a single axial bore and the peripheral grooves in communication therewith. Specifically, it is an object to provide a novel hydraulic device for use in combination with a shaft having an axial bore with a plurality of spaced radial passageways in communication therewith, which can be inserted predetermined distances into the bore for sealing off or isolating selected portions of the bore, and for introducing fluid under pressure to said sealed-off portions and the peripheral grooves in communication therewith.

Another object is to provide a novel hydraulic assembly for removing interference-fitted rings which is relatively inexpensive, and which is relatively simple and rugged in construction so as to require a minimum amount of maintenance and repair.

Further objects and advantages of the present invention will be readily apparent from the following detailed description, reference being had to the accompanying drawing wherein a preferred embodiment of the present invention is shown.

Briefly, the invention comprises the combination of a shaft for receiving an interference-fitted member and having an axial bore therein; a plurality of axially spaced radial passageways in the shaft in communication with the bore; and a hydraulic device adapted to be inserted into the bore predetermined distances for introducing fluid pressure to selected radial passageways, said device including a tubular member having spaced O-rings associated therewith for sealing engagement with the wall of the bore for sealing off a portion thereof, and means for introducing fluid under pressure into the sealed-off portion.

In the drawing:

Fig. 1 is a side elevational view of a hydraulic removal device constructed in accordance with the teachings of the present invention, Fig. 2 is a vertical longitudinal sectional view showing the hydraulic removal device in combination with a shaft containing a single axial bore, the hydraulic removal device being positioned to introduce fluid under pressure to both peripheral grooves of the shaft, and Fig. 3 is a sectional view similar to Fig. 2, but with the bearing cone partially removed, and the hydraulic removal device moved outwardly to a position to limit the fluid pressure to the outermost peripheral groove.

Referring to the drawing more particularly by reference numerals, 10 indicates generally a hydraulic removal device shown in combination with a shaft 12, both being constructed in accordance with the teachings of the present invention.

The shaft 12 contains a body portion 13 which receives an interference-fitted bearing cone 14 and an end portion 15 of reduced diameter which provides a shoulder 16 between it and the body portion 13.

The shaft 12 also contains an axial bore 17 which intersects spaced radial-extending passageways 18 and 20, the passageway 18 being positioned close to the shoulder 15, for a purpose to appear.

Fluid dispersing grooves 22 and 24 are contained in the outer peripheral surface of the shaft 12 under the cone 14, and are in communication with the radial passageways 18 and 20, respectively.

The hydraulic removal device 10 includes a tubular member 26 which is threaded at each end and which includes an aperture 28 in the wall thereof adjacent the inner end.

Threadedly mounted on the inner end of the tubular member 26 is a cap member 30.

A back-up sleeve 32 is slidably mounted on the tubular member 26 in abutting relationship with the cap member 30 so as to provide a shoulder.

Abutting the back-up sleeve 32 is a first O-ring 34 which is disposed about the tubular member 26, and spaced axially therefrom is a second O-ring 36, similarly mounted on the tubular member. Both of the O-rings 34 and 36 have a normal outside diameter which is slightly less than the inside diameter of the bore 17, for a purpose to appear.

Slidably mounted on the tubular member 26 between the O-rings 34 and 36, is a spacer sleeve 38 which contains an elongated inner peripheral groove 39 and a similarly-shaped outer peripheral groove 40. Opposed radial apertures 42 are contained in the wall of the spacer sleeve 38 so as to interconnect the grooves 39 and 40.

A loading sleeve 44 is slidably disposed on the tubular member 26 so as to have the inner end thereof in abutting relationship with the O-ring 36.

Threadedly mounted on the outer end of the tubular member 26 is an adaptor 46 for connecting a fluid pressure line thereto. A loading nut 48 is threadedly mounted on the adaptor 46, the inner end of the loading nut 48 bearing against the outer end of the loading sleeve 44. Thus, by rotating the loading nut 48 inwardly relative to the adaptor 46, the loading sleeve 44 is moved axially inwardly so as to compress the O-rings 34 and 36 between the loading sleeve 44, the spacer sleeve 38, and the back-up sleeve 32.

*Operation*

To remove the interference-fitted bearing cone 14 which is positioned on the shaft 12 so as to cover both oil-dispersing grooves 22 and 24 (Fig. 1), the hydraulic removal device 10, which has the loading nut 48 backed-off so that there is no axial pressure on the O-rings 34 and 36, is inserted into the bore 17 whereby the radial passageways 18 and 20 are positioned between the O-rings 34 and 36.

The loading nut 48 is then threaded inwardly relative to the adaptor 46 so as to move the loading sleeve 44 against the O-ring 36 to cause the O-rings 34 and 36 to be axially compressed between the loading sleeve 44, the spacer sleeve 38 and the back-up sleeve 32. This causes the O-rings 34 and 36 to expand radially so as to enter into sealing engagement with the tubular member 26 and the inner wall of the bore 17 and thereby seal off or isolate the space within the bore defined by the O-rings.

Fluid under relatively high pressure is then introduced through the adaptor 46 into the interior of the tubular member 26. The fluid passes through the aperture 28 into the inner peripheral groove 39, and thence through the apertures 42 to the outer peripheral groove 40.

The radially expanded O-rings 34 and 36 effectively seal off the space between them, as previously described, and confine the fluid to the vicinity of the inner end of the radial passageways 18 and 20. Thus, the fluid under pressure passes outwardly through the radial passageways 18 and 20 to the fluid dispersing grooves 22 and 24 so as to lubricate the area between the outer peripheral surface of the shaft 12 and the inner surface of the bearing cone 14, and exert a pressure therebetween.

An axial external force is then applied to the end of the bearing cone 14 in a direction to urge it off the end of the body portion 13 of the shaft 12, so as to move it to the position shown in Fig. 3 in which it is about to uncover the fluid dispersing groove 24.

The fluid pressure in the device 10 is then removed, the loading nut 48 backed-off to permit the O-rings 34 and 36 to resume their normal shape, and the hydraulic removal device 10 partially withdrawn to the position shown in Fig. 3 in which only the radial passageway 18 is in communication with the space between the O-rings 34 and 36. It will be noted that the distance between the end of the shaft 12 and the passageway 18, and the distance between the O-rings 34 and 36, is such that when the device 10 is in the position to admit fluid to only the radial passageway 18, the outermost O-ring 36 is still within the bore 17. Also, that the oil-dispersing groove 22 is close to the shoulder 16.

The loading nut 48 is then rotated inwardly to compress the O-rings 34 and 36 in the manner previously described, and fluid pressure introduced into the interior of the tubular member 26, the passageway 18 and the fluid dispersing groove 22.

The bearing cone 14 can then be moved to the position in which the groove 22 is about to be uncovered, at which time the fluid pressure is removed. Thereafter, the bearing cone 14 is removed off the body portion 13 solely by mechanical force.

It is readily apparent that the device can also be used in like manner for mounting an interference-fitted member on a shaft, the only difference being that the hydraulic removal device 10 is initially positioned adjacent the outer end of the bore 17, and is moved inwardly in stepwise fashion as the bearing member 14 is forced onto the body portion 13 of the shaft 12.

Thus, it is apparent that there has been provided a novel hydraulic assembly for removing interference-fitted members, which fulfills all of the objects and advantages sought therefor. The hydraulic removal device 10 limits the fluid pressure to any selected radial passageway or passageways and their associated fluid dispersing grooves so that only a single axial bore is required. Furthermore, the device is of relatively simple and rugged construction, and is relatively inexpensive to manufacture.

It is to be understood that the foregoing description and the accompanying drawing have been given only by way of illustration and example, and that changes and alterations in the present disclosure, which will be readily apparent to one skilled in the art, are contemplated as within the scope of the present invention which is limited only by the claims which follow.

What is claimed is:

1. A device of the type described, comprising a tubular member of uniform cross section having an open inner end and an open outer end; a cap with a shoulder positioned on the inner end thereof; a first O-ring disposed about the tubular member and maintained in fixed position relative to the shoulder; a second O-ring disposed about the tubular member in spaced relationship with the first O-ring; a spacer sleeve disposed about the tubular member between the O-rings, the ends of the spacer sleeve being of substantially the same thickness as the thickness of the O-rings; openings formed in the tubular member and spacer sleeve and in communication with each other whereby the interior of the tubular member is in communication with the exterior of the spacer sleeve; a loading sleeve disposed about the tubular member adjacent the outer end thereof and having one end abutting the second O-ring; and means associated with the tubular member for moving the loading sleeve axially inwardly relative thereto for compressing the O-rings between the shoulder, the spacer sleeve, and the loading sleeve.

2. A device of the type described, comprising a tubular member having a closed inner end and an open outer end; abutment means forming an exterior shoulder on the inner end of said tubular means; a first O-ring positioned about said tubular member in abutting relation with said abutment means; a second O-ring positioned about said tubular member in spaced relation with said first O-ring; a spacer sleeve positioned about said tubular member between said O-rings and having ends in slidable contact with said tubular member, the ends having enlarged surfaces forming abutments with said O-rings; openings formed in said tubular member and sleeve, said openings being in communication whereby the interior of said tubular member is in communication with the exterior of said sleeve; and a loading sleeve having an end abutment in contact with said second O-ring, said loading sleeve being adjustably mounted on the outer end of said tubular member for axial displacement inwardly to compress the O-rings between the abutment means, the spacer sleeve and the loading sleeve, whereby said O-rings are deformed radially outwardly.

References Cited in the file of this patent

UNITED STATES PATENTS

| | | |
|---|---|---|
| 1,068,793 | Mason | July 29, 1913 |
| 1,206,563 | McConnell | Nov. 28, 1916 |
| 1,251,065 | McCain | Dec. 25, 1917 |
| 2,084,439 | Hamer | June 22, 1937 |
| 2,187,147 | Engleson | Jan. 16, 1940 |
| 2,241,526 | Rosenkranz | May 13, 1941 |
| 2,311,108 | Hauser | Feb. 16, 1943 |
| 2,343,491 | Bard | Mar. 7, 1944 |
| 2,348,293 | Hamer | May 9, 1944 |
| 2,418,245 | Buckwalter | Apr. 1, 1947 |
| 2,578,542 | Hanson | Dec. 11, 1951 |

FOREIGN PATENTS

| | | |
|---|---|---|
| 67,766 | Netherlands | May 15, 1951 |